US012747142B2

(12) United States Patent
Anderson-Sprecher et al.

(10) Patent No.: US 12,747,142 B2
(45) Date of Patent: Sep. 29, 2026

(54) SYSTEMS AND METHODS FOR FLUSH PLACEMENT OF PALLETS BY AN AUTONOMOUS FORKLIFT

(71) Applicant: Symbotic LLC, Wilmington, MA (US)

(72) Inventors: Peter Anderson-Sprecher, Austin, TX (US); Krishnan Balasubramanian, Austin, TX (US); Arun Joseph, Austin, TX (US)

(73) Assignee: Symbotic LLC, Wilmington, MA (US)

( * ) Notice: Subject to any disclaimer, the term of this patent is extended or adjusted under 35 U.S.C. 154(b) by 78 days.

(21) Appl. No.: 18/642,962

(22) Filed: Apr. 23, 2024

(65) Prior Publication Data

US 2025/0326615 A1 Oct. 23, 2025

(51) Int. Cl.

*B66F 9/06* (2006.01)
*B66F 9/075* (2006.01)
*B66F 9/22* (2006.01)
*B66F 17/00* (2006.01)

(52) U.S. Cl.

CPC ............ *B66F 9/063* (2013.01); *B66F 9/0755* (2013.01); *B66F 9/22* (2013.01); *B66F 17/003* (2013.01)

(58) Field of Classification Search

CPC .......... B66F 9/063; B66F 9/0755; B66F 9/22; B66F 17/003

See application file for complete search history.

(56) References Cited

U.S. PATENT DOCUMENTS

| | | | | |
|---|---|---|---|---|
| 9,694,975 | B2 | 7/2017 | Lert et al. | |
| 10,131,388 | B2 | 11/2018 | Kilibarda | |
| 10,328,578 | B2 | 6/2019 | Holz | |
| 10,776,651 | B2 | 9/2020 | Yuvaraj et al. | |
| 11,142,413 | B2 | 10/2021 | Hoofard et al. | |
| 11,738,456 | B2 | 8/2023 | Neville et al. | |
| 2010/0266381 | A1* | 10/2010 | Chilson | G05D 1/024 414/809 |
| 2013/0054129 | A1* | 2/2013 | Wong | B66F 9/063 702/150 |
| 2019/0193629 | A1* | 6/2019 | Zevenbergen | G01C 21/20 |
| 2020/0026301 | A1* | 1/2020 | Taylor | G05D 1/0214 |
| 2020/0239242 | A1* | 7/2020 | Hoofard | G05D 1/646 |
| 2021/0247493 | A1* | 8/2021 | Agarwal | B60R 11/04 |
| 2022/0267131 | A1* | 8/2022 | Magzimof | B66F 9/07581 |
| 2023/0063018 | A1* | 3/2023 | Dooley | B66F 9/063 |
| 2023/0236600 | A1* | 7/2023 | Arandorenko | G06V 40/10 701/26 |
| 2024/0067510 | A1* | 2/2024 | Ulbrich | B66F 9/063 |

* cited by examiner

*Primary Examiner* — Jelani A Smith
*Assistant Examiner* — Alyssa Rorie
(74) *Attorney, Agent, or Firm* — Perman & Green, LLP

(57) ABSTRACT

The present invention relates, in general, to systems and methods for controlling autonomous forklifts, and specifically, for placing pallets in a flush manner with adjacent objects and obstacles, such as other pallets, walls, and structures. The present invention allows autonomous forklifts to optimize the footprint required to store pallets, thereby increasing the storage efficiency within warehouses and trailers where square footage is typically at a premium, and where space utilization and load stability are paramount.

20 Claims, 7 Drawing Sheets

SYSTEMS AND METHODS FOR FLUSH PLACEMENT OF PALLETS BY AN AUTONOMOUS FORKLIFT

BACKGROUND

Field of the Invention

The present invention relates, in general, to computer implemented systems and methods for controlling autonomous forklifts, and specifically, for placing pallets in a flush manner with adjacent pallets, walls, structures, and other obstacles.

Description of Related Art

Warehouses typically include multiple loading dock stations that facilitate the movement of goods between the warehouse and a vehicle, such as a semi-truck trailer, parked at the loading dock. Goods being delivered by, or loaded onto, trailers typically are stored on pallets, which are flat transport structures configured to hold goods for easier transportation by vehicles and other equipment, such as forklifts, operating in the warehouse.

Traditionally, human personnel have operated forklifts. However, with advances in autonomous vehicle technology, autonomous forklifts are increasingly being used in warehouse environments to lift and place pallets, as well as to transport pallets between various locations, such as to and from trailers parked at loading docks. While such technological advancement allows for increased operational efficiency within warehouses, autonomous forklifts are limited in that they can only pick and place pallets that are free from adjacent interference by other pallets, walls, structures, and other obstacles. This limitation requires that pallets are placed with sufficient clearance on all sides, which increases the area and footprint required to store pallets. Inefficient use of space poses a challenge in warehouses where square footage is typically at a premium, as well as in trailers where space utilization and load stability are paramount.

Thus, there is a need for systems and methods that allows for the flush placement of pallets relative to adjacent obstacles such that the space required to place the pallet is optimized.

SUMMARY

In an embodiment, the present invention is directed to a system for flush placement of pallets by an autonomous forklift, comprising: a controller; a sensor module containing at least one sensor communicatively coupled to the controller; a perception module communicatively coupled the controller, the perception module identifying an obstacle in data received from the sensor module; a planning module communicatively coupled to the controller, the planning module determining an exclusion area adjacent to the obstacle, a target placement location that overlaps at least partially with the exclusion area, and a target placement height; a drive wheel communicatively coupled to the controller; and a load-handling assembly communicatively coupled to the controller, the load-handling assembly comprising a pair of forks capable of supporting a pallet, wherein the controller is configured to: manipulate the drive wheel to navigate the autonomous forklift to a location in proximity to the target placement location, manipulate the load-handling assembly to place the pair of forks at the target placement height, manipulate at least one of the drive wheel and the load-handling assembly to position the pair of forks within the target placement location, determine if resistance is present against the pallet, and manipulate at least one of the drive wheel and the load-handling assembly to retract the forks from the pallet if resistance is present.

In another embodiment, the present invention is directed to a system for flush placement of pallets by an autonomous forklift, comprising: a controller; a sensor module containing at least one sensor communicatively coupled to the controller; a perception module communicatively coupled the controller, the perception module identifying an obstacle in data received from the sensor module; a planning module communicatively coupled to the controller, the planning module determining an exclusion area adjacent to the obstacle and a target placement location that overlaps at least partially with the exclusion area; a drive wheel communicatively coupled to the controller; and a load-handling assembly communicatively coupled to the controller, the load-handling assembly comprising a pair of forks capable of supporting a pallet, where the controller is configured to: manipulate the drive wheel to navigate the autonomous forklift to a location in proximity to the target placement location, manipulate at least one of the drive wheel and the load-handling assembly to position the pair of forks is within the target placement location, determine if resistance is present against the pallet, and manipulate at least one of the drive wheel and the load-handling assembly to retract the forks from the pallet if resistance is present.

In yet another embodiment, the present invention is directed to a method of placing pallets flush against adjacent obstacles by an autonomous forklift having a drive wheel and a load-handling assembly with a pair of forks capable of supporting a pallet, comprising: collecting visual data on an environment traversed by the autonomous forklift by a sensor module; identifying an obstacle in the visual data by a perception module; generating a costmap of the environment based on the identified obstacle by a planning module, wherein the costmap includes an exclusion area adjacent to the identified obstacle; determining a target placement location of the pallet based on the costmap by the planning module, wherein the target placement location overlaps at least partially with the exclusion area; actuating at least one of the drive wheel and the load-handling assembly to locate the pair of forks within the target placement location by a controller; determining if resistance is present against the pallet by the controller; and manipulating at least of the drive wheel and the load-handling assembly to retract the forks from the pallet if resistance is present.

BRIEF DESCRIPTION OF THE DRAWINGS

These and other embodiments of the present invention will be discussed with reference to the following exemplary and non-limiting illustrations, in which like elements are numbered similarly, and where.

DEFINITIONS

Figure 1A:
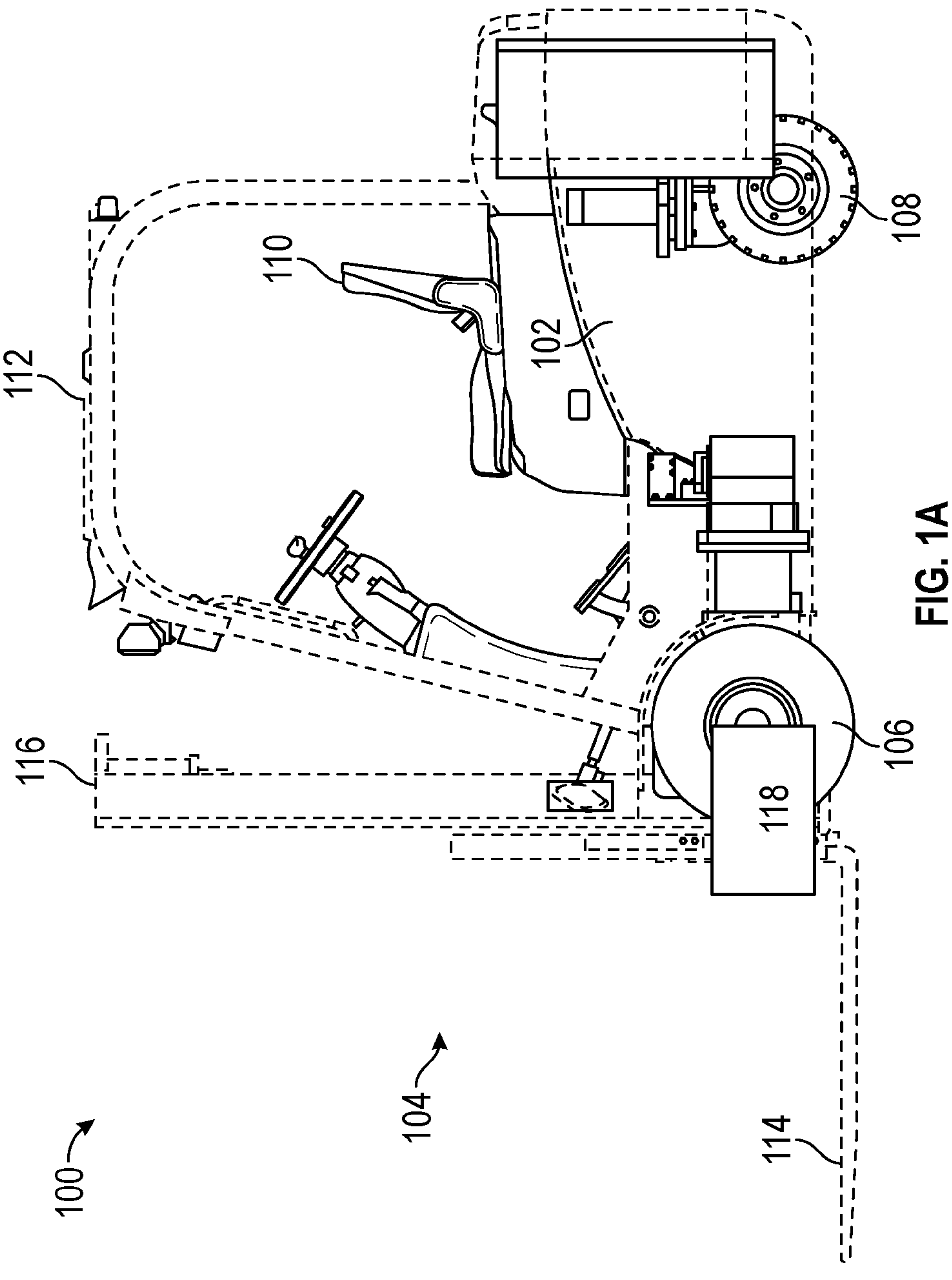
FIGS. 1A and 1B depict an autonomous forklift, according to an embodiment of the present invention.

The following definitions are meant to aid in the description and understanding of the defined terms in the context of the present invention. The definitions are not meant to limit these terms to less than is described throughout this specification. Such definitions are meant to encompass grammatical equivalents.

As used herein, the term "autonomous forklift" can refer to, for example, autonomous mobile robots, automatic guided vehicles, vision guided vehicles, semi-autonomous vehicles, and remote-piloted autonomous vehicles, as examples, which serve as equipment, pallet, object, and cargo moving and transport vehicles, including, but not limited to, fork trucks, pallet loaders, side loaders, lift trucks, fork hoists, stacker-trucks, trailer loaders, industrial trucks, pallet jacks, pallet stackers, tow tractors, tugs, and the like.

As used herein, the terms "sensor" and "detector" can refer to, for example, sensing technologies that utilize Light Detection and Ranging (LiDAR), laser scanners, range finders, radar, infrared sensors, sonar, ultrasonic sensors, optical sensors, such as photoelectric sensors, fiber optic sensors, photoconductive devices, reflective sensors, phototransistors, ambient light sensors, infrared sensors, photodiodes, and optical switches, point sensors, proximity sensors, through beam sensors, light curtains, image and video capturing devices, machine vision systems, any combination thereof, and the like.

As used herein, the term "inertial measurement unit" and "IMU" can refer to, for example, accelerometers, gyroscopes, magnetometers, pressure sensors, any combination thereof, and the like.

As used herein, the term "network" can refer to, for example, the Internet, a wide area network (WAN), metropolitan area network (MAN), controller area network (CAN), local area network (LAN), but the network could at least theoretically be of an applicable size or characterized in some other fashion (i.e., personal area network (PAN), home area network (HAN), and the like), a wireless network, a wireless mesh network, a cellular network, a landline network, and/or a short-range connection network (i.e., such as Bluetooth, Zigbee, infrared, and the like). The term "network" can further refer to enterprise private networks, edge networks, and/or virtual private networks.

As used herein, the term "processor" can refer to, for example, any programmable system including systems using micro-controllers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "processor."

As used herein, the terms "software" and "firmware" are interchangeable, and can refer to, for example, any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the term "database" can refer to, for example, a persistent data store with indexing capabilities to expedite query processing. The database can implement various database management systems types such as relational, object-oriented, hierarchical, document-oriented, flat file, object-relational, and any other structured collection of records. The database can be stored locally, remotely, on a cloud environment, and/or on a distributed ledger.

As used herein, the term "costmap" can refer to, for example, a representation of the robot environment that assigns a cost value to each cell in a representation of a ground surface based on the occupancy, obstacle distance, inflation radius, and other factors. For instance, a costmap can be a two-dimensional (2D) map or a three-dimensional (3D) map with lower values where the ground surface is flat or clear, and higher where the ground surface is obstructed. The values held in a costmap can be used to guide a route planning algorithm to find an efficient and safe route across the ground surface for an autonomous vehicle.

As used herein, the term "artificial intelligence" can refer to, for example, machine learning, deep-learning, supervised learning, unsupervised learning, semi-supervised learning, generative artificial intelligence, reinforced learning, fuzzy logic, neural networks, historical data and pattern analysis, any combination thereof, and the like.

As used herein, the term "module" can refer to, for example, hardware components, software components, such as source code, packages, libraries, algorithms, and the like, as well as combinations therein.

As used herein, the term "bump sensor" can refer to, for example, a bump switch, bumper switch, push-button switch, snap-action switch, limit switch, touch switch, and the like, which provides a signal indicating whether the autonomous forklift is in contact with, or receiving resistance from, an obstacle.

DETAILED DESCRIPTION

It should be understood that aspects of the present invention are described herein with reference to the figures, which show illustrative embodiments. The illustrative embodiments herein are not necessarily intended to show all embodiments in accordance with the invention, but rather are used to describe a few illustrative embodiments. Thus, aspects of the invention are not intended to be construed narrowly in view of the illustrative embodiments. In addition, although the present invention is described with respect to its application for an autonomous forklift operating in a warehouse and/or loading dock environment, it is understood that the system could be implemented in any autonomous or semi-autonomous vehicle system operating in any environment where pallets are required to be lifted, transported, and/or placed in a space-optimizing manner.

Figure 1B:
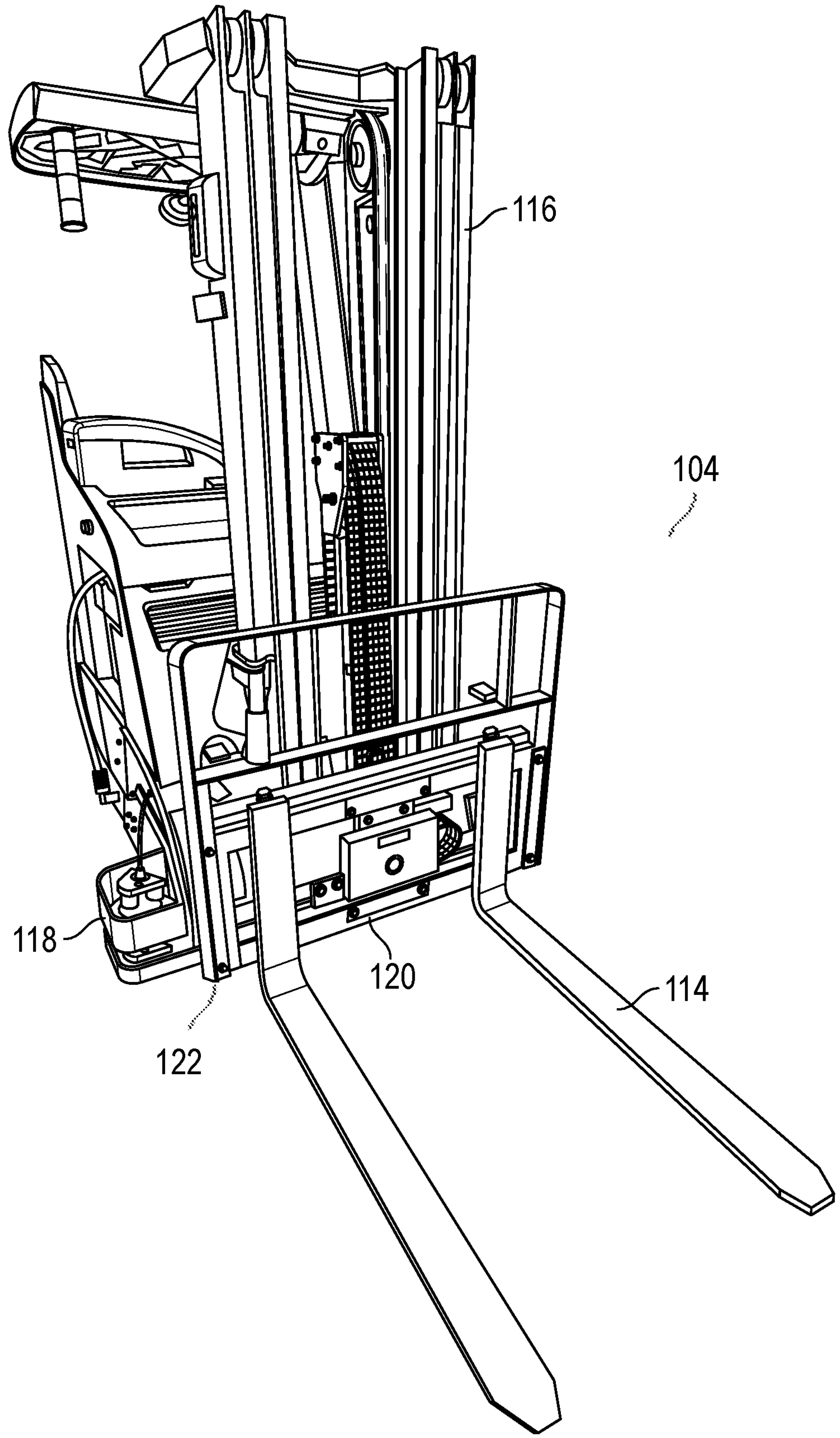

FIGS. 1A and 1B depict an autonomous forklift 100, according to an embodiment of the present invention. The autonomous forklift 100 includes a body 102 and a load-handling system 104 that is coupled to the front of the body 102. An operator's compartment 110 can be provided in the center of the body 102. In one or more embodiments, an operator's compartment 110 may be installed to enable a manual or semi-autonomous operation of the autonomous forklift 100. Alternatively, in an embodiment, the autonomous forklift 100 may be fully autonomous, without the operator's compartment 110.

The body 102 stands on front drive wheels 106 and at least one rear wheel 108. Specifically, the front pair of wheels are drive wheels 106 and the rear wheel 108 is a steer wheel. The drive wheels 106 provide the power to move the autonomous forklift 100 forward or backwards. In an embodiment, the drive wheels 106 are a plurality of wheels that are mechanically coupled to a chassis of the autonomous forklift 100. The plurality of drive wheels 106 and the rear wheel 108 enable movement of the chassis along a ground surface. A motor is mechanically coupled to at least one wheel in the plurality of drive wheels 106. The motor can rotate the at least one wheel and turn the at least one wheel to slow and/or stop the autonomous forklift 100.

Further, the drive wheels 106 may move only in two directions (e.g., forward, and backward) or turn under a plurality of angles. Additionally, the rear wheel 108 may be responsible for changing the direction of the autonomous forklift 100.

In another embodiment, the rear wheel 108 may serve as a driving force provider, while the two front wheels 106 may serve as stabilizers.

The autonomous forklift 100 may be powered by an internal combustion engine, an electric motor, a fuel cell, or a combination thereof, such as in a hybrid powered vehicle. The body 102 may include an overhead guard 112 that covers the upper part of the operator's compartment 110.

Further, the load-handling system 104 includes a mast 116. The mast may include inner masts and outer masts, where the inner masts are slidable with respect to the outer masts. In an embodiment, the mast 116 may be movable with respect to the vehicle body 102. The movement of the mast 116 may be operated by hydraulic tilt cylinders positioned between the body 102 and the mast 116. The tilt cylinders may cause the mast 116 to tilt forward and rearward around the bottom end portions of the mast 116. Additionally, a pair of hydraulically operated lift cylinders may be mounted to the mast 116 itself. The lift cylinders may cause the inner masts to slide up and down vertically relative to the outer masts.

Further, a pair of forks 114 are mounted to the mast 116 through a lift bracket, which is slidable up and down vertically relative to the inner masts. In an embodiment, the inner masts, the forks 114, and the lift bracket all provide a vertical lifting function. The load-handling system 104 also includes a side-shifter assembly 122, allowing for accurate lateral (i.e., left, and right horizontal) positioning of the forks 114. In an embodiment, the lift bracket side-shift actuation is performed by hydraulically actuated cylinders, in other embodiments it is driven by electric linear actuators.

Thus, the load-handling assembly 104 provides a shifting function of the forks 114, as well as a vertical lifting and lowering function of the forks 114. In an embodiment, each fork can be laterally adjusted independent of the other fork.

Figure 2:
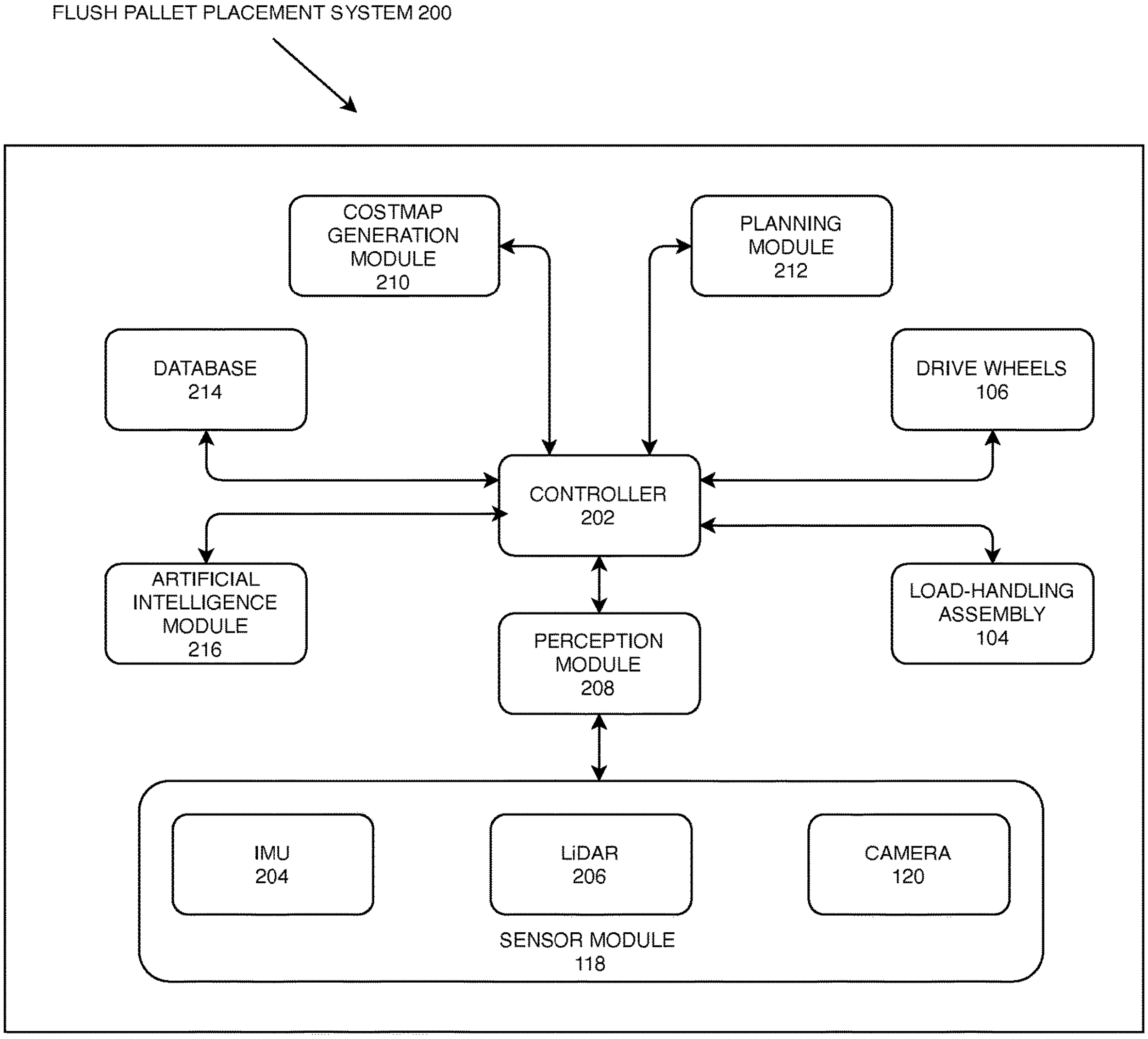
FIG. 2 is a block diagram of a flush pallet placement system for the autonomous forklift, according to an embodiment of the present invention.

In an embodiment, the autonomous forklift 100 includes a sensor module 118, that includes a plurality of sensors, as well as at least one camera 120, as described herein with respect to FIG. 2.

The autonomous forklift 100 is described in more detail in commonly owned application Ser. No. 18/480,214 entitled "Method and system for operating automated forklift", filed on Oct. 3, 2023, and commonly owned application Ser. No. 18/410,774 entitled "Method and system for deep learning based perception", filed on Jan. 11, 2024, both of which are incorporated by reference herein.

FIG. 2 is a block diagram of a flush pallet placement system 200 for the autonomous forklift 100, according to an embodiment of the present invention. In an embodiment, the flush pallet placement system 200 includes a controller 202 that is communicatively coupled to the sensor module 118, a perception module 208, a costmap generation module 210, a planning module 212, the load-handling assembly 104, and the drive wheels 106 via a network. The network may be any type of network suitable to allow interaction between the components of flush pallet placement system 200, such as a CAN bus on-board the autonomous forklift 100. In another embodiment, the network may be a wired network, a wireless network, a mesh network, or any combination thereof.

In an embodiment, the controller 202 consists of computing hardware, such as a processor, and software which is executed by the processor. In an exemplary embodiment the controller 202 is located on-board the autonomous forklift 100. In another embodiment, the controller 202 can include a server coupled to the network. In another embodiment, the controller 202 is cloud-based, and located on remote server, such as on a server provided by Google® Cloud Platform or the like. In yet another embodiment, the controller 202 can be distributed across multiple servers.

In an embodiment, the controller 202 receives input, such as data, from the sensor module 118, the perception module 208, the costmap generation module 210, the planning module 212, the database 214, and the artificial intelligence module 216, and provides output, such as commands to the load-handling assembly 104 and the drive wheels 106.

In an embodiment, the sensor module 118 includes a plurality of sensors including, at least, an IMU 204, a LiDAR system 206, and/or at least one camera 120.

In an embodiment, the IMU 204 combines a plurality of sensors (e.g., accelerometer, gyroscope, magnetometer, pressure sensor . . . ) to provide data regarding the orientation, acceleration, and angular velocity of the autonomous forklift 100. More specifically, an accelerometer of the IMU 204 may measure linear acceleration to determine changes in velocity and direction. Further, a gyroscope of the IMU 204 may measure rotational movements and the magnetometer detects the Earth's magnetic field and to determine orientation information as well as the angle of tilt of the autonomous forklift 100.

In an embodiment, the IMU 204 can be communicatively coupled to the drive wheels 106 and/or the load-handling assembly 104 and can receive signals therefrom. The IMU 204 can collect, for example, information related to speed, velocity, orientation, angular rates, direction, gravitational forces, wheel rotation, and the like, of the drive wheels 106.

Furthermore, the IMU 204 can collect, for example, information related to the weight or load carried, lateral and vertical adjustments of each fork, tilt of the forks 114, and the like.

In an embodiment, the camera 120 may be a line scan or area scan camera, a CCD camera, a CMOS camera, or any other suitable camera used in robotics. The camera 120 may capture images in monochrome or in color. Physically, the camera 120 may be located on the front side of the autonomous forklift 100 to be able to capture the position of the forks 114, as well as the surrounding environment that faces the forward movement direction of the autonomous forklift 110. Additionally, there may be one or more cameras disposed on the autonomous forklift 100, such as a camera array and/or multiple cameras located at various locations on the autonomous forklift 100, such as to provide a 360 degree field of view around the autonomous forklift 100. In an embodiment, the camera 120 captures image data and video data.

In an embodiment, the LiDAR system 206 and/or the camera 120 can further be mounted on the forks 114.

The use of the IMU 204, the LiDAR system 206, and the camera 120 in the sensor module 118 is exemplary, and are not intended to be a limiting. The sensor module 118 can include various other sensing or detecting devices as described herein.

In an embodiment, the perception module 208 receives visual data from the sensor module 118 that is collected as the autonomous forklift 100 traverses an environment. The visual data can include, for example, a collection of low and high resolution video frames and/or images, including but not limited to one or more (e.g., monocular or stereo) color or grayscale light intensity images, 3D depth images, and derived images such as 2D or 3D traversability maps, or sets of features recognized within the visual data.

The perception module 208 performs object recognition on the visual data, and determines if obstacles are present in the visual data. If an obstacle is detected in the visual data, the perception module 208 classifies each obstacle, such as, for example, as a human, a pallet, a wall, a vehicle, a trailer, and the like.

In an embodiment, the costmap generation module 210 uses the processed visual data from the perception module 208 to generate a costmap that represents the traversability of the environment in which the autonomous forklift 100 is operating. For each obstacle detected by the perception module 208, exclusion values are set for each obstacle by the costmap generation module 210 based on the obstacle classification. For example, if the obstacle is classified as a human, then a high exclusion value is assigned to the obstacle, whereas, if the obstacle is classified as a pallet, then a lower exclusion value is assigned to the obstacle. The exclusion values are used to create exclusion areas (or buffer zones) around each obstacle in the costmap.

In an embodiment, the exclusion areas can also include obstacles not only around the sides of each obstacle, but also above and below each obstacle, in the event an obstacle is a shelf, a rack, or another pallet onto which the pallet is to be placed by the autonomous forklift 100.

In an embodiment, the planning module 212 generates a plan for placing or inserting the pallet carried by the autonomous forklift 100 based on the costmap. As described with more detail herein, in addition to core motion planning of the autonomous forklift 100, the planning module 212 determines margins within exclusion areas where a pallet can likely be inserted flush adjacent to obstacles. The margins allow the planning module 212 to determine a target placement location which overlaps at least partially with the exclusion areas. The target placement location is thus a location at least partially within the exclusion area where the autonomous forklift 100 can perform flush placement of the pallet.

In an embodiment, the margins are fixed values based on an obstacle type and the location where the obstacle is located. These fixed values for the margins can be stored in the database 214, and can be set and updated by a human operator based on engineering and safety requirements of a particular environment, pallet loading operation, and the like. In another embodiment, the fixed values for the margins can set and updated by the artificial intelligence module 216 based on collected data over time.

In an embodiment, the functions of the costmap generation module 210 can be performed in whole or in part by the planning module 212. In another embodiment, the functions of the planning module 212 can be performed in whole or in part by the costmap generation module 212. In yet another embodiment, the costmap generation module 210 can be a sub-module within the planning module 212.

In an embodiment, the database 214 is configured to store various data, receive queries from the controller 202, and return data to the controller 202 in response to the queries. The database 214 can store visual data collected by the sensor module 118, data processed by the perception module 208, data collected from the drive wheels 106, data collected from the load-handling assembly 104, and/or costmaps and relevant information generated by the planning module 212.

For example, the database 214 can store data collected by the sensors module 118 related to motion, navigation, speed, and trajectory of the autonomous forklift, as well as detected obstacles, collision avoidance maneuvers undertaken, and work performed such as picking and placing operations of pallets.

In an embodiment, the data in the database 214 is stored with an identifier related to at least one of a carried pallet, the autonomous forklift, a loading location, a placement location and/or any combination thereof. In addition, the data in the database 214 can be stored with timestamps.

This data may be stored locally within a database on the autonomous forklift, and can be transmitted to the controller 202, which can process the data, and further transmit data from the sensor module 118, costmap generation module 210, planning module 212, and other sensors on the autonomous forklift 100, to the database 214 for storage and subsequent retrieval.

In another embodiment, all or portion of the data can be stored remotely on a remote database which is accessible by the controller 202.

In an embodiment, the artificial intelligence module 216 is communicatively coupled to the controller 202 and/or the database 214. The artificial intelligence module 216 can analyze data collected over time by the sensor module 118, the load-handling assembly 104 and/or the drive wheels 106. This analysis by the artificial intelligence module 216 allows the controller 202 to process the future data more efficiently, quickly generate commands, and improve the efficacy and accuracy of the flush pallet placement system 200.

For example, the artificial intelligence module 216 can analyze historical placement plans for a particular trailer, and use the historical data to suggest a placement plan, target placement location, target placement height, and the like, for a current placement operation or a subsequent placement operation.

Figure 3:
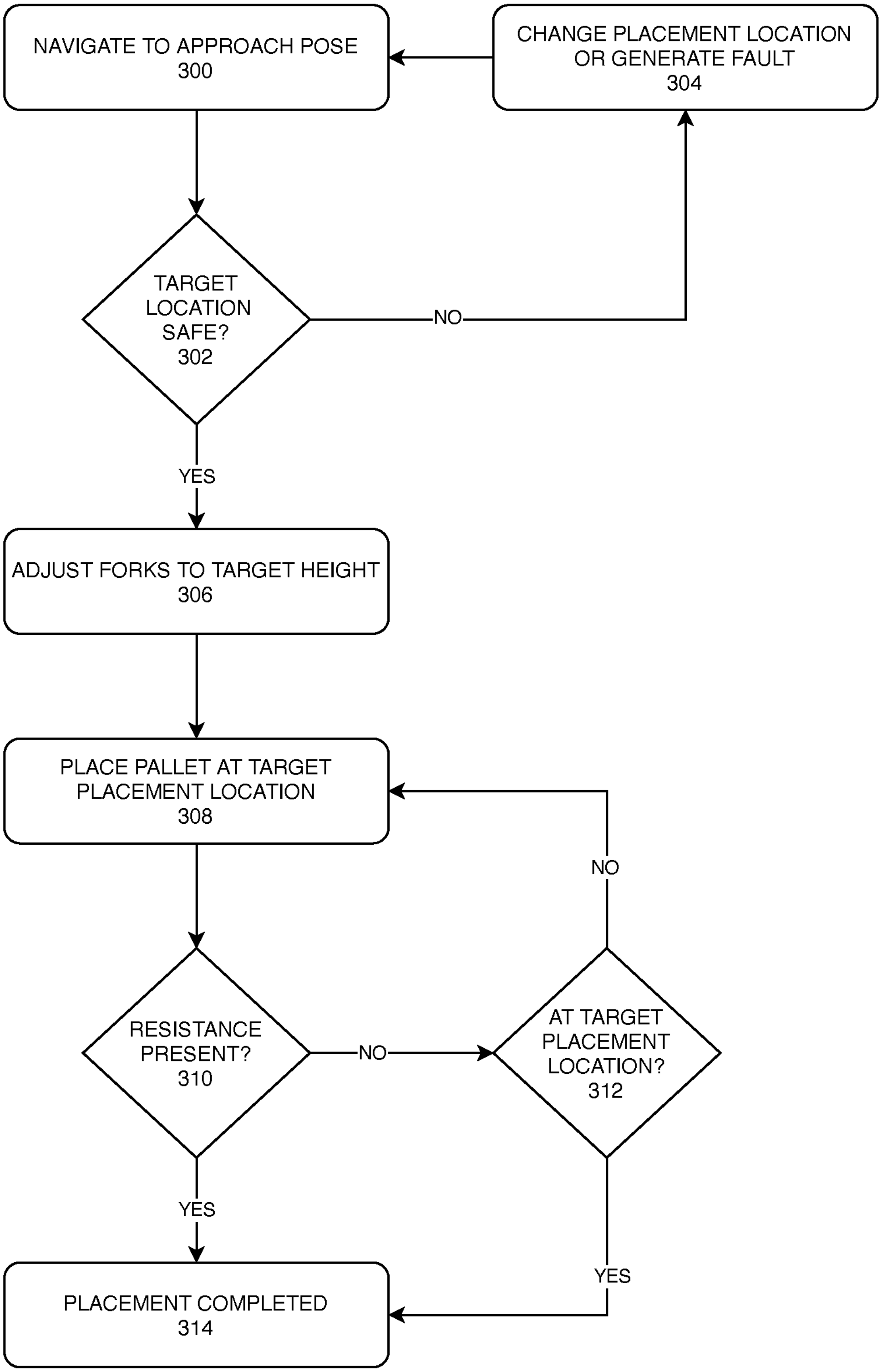
FIG. 3 is a flowchart illustrating the steps of operation of the flush pallet placement system, according to an embodiment of the present invention.

FIG. 3 is a flowchart illustrating the steps of operation of the flush pallet placement system 200. At step 300, the autonomous forklift 100 navigates to an approach pose, which is a location in close proximity to a target placement location of the pallet, but where the autonomous forklift 100 is not in collision or contact with any adjacent obstacles.

In an embodiment, the target placement location is a location where the pallet can be placed such that it is flush with any adjacent pallets, walls, structures, and other obstacles.

In an embodiment, the controller 202 navigates the autonomous forklift 100 to the approach pose based on the costmap, where the approach pose is a safe minimum distance from adjacent obstacles based on the exclusion areas in the costmap where the autonomous forklift 100 can safely traverse. The exclusion areas provide flexibility in navigation such that in the event nearby persons or obstacles unexpectedly move, the safe minimum distance allows the autonomous forklift 100 to maintain its course with little or no adjustment to its route.

In addition, the planning module 212 considers consider any inherent limitations in the sensor module 118 and/or unknown environmental disturbances when determining the exclusion areas.

At step 302, the controller 202 determines if the target placement location is a safe location for the autonomous forklift 100 to operate in and/or a safe location for the pallet to be placed. In an embodiment, the controller 202 receives visual data from the sensor module 118 to determine if the target placement location is a safe location.

If the placement location is deemed to be unsafe, then the controller 202 changes the placement location or generates a fault at step 304. If a fault is generated, a human operators may be notified and prompted to intervene to identify a new target placement location.

If, however, the target placement location is deemed to be safe, the controller 202 commands the load-handling assembly 104 to adjust the forks 114 to a target placement height at step 306. In an embodiment, the target placement height is a height at which the pallet will be placed, inserted and/or unloaded. The forks 114 are adjusted to the target placement height prior to the autonomous forklift 100 and/or forks 114 moving closer to the target placement location.

In an embodiment, the target placement location can be a floor, a top surface of another pallet, a rack or shelf within a pallet racking system, and the like.

At step 308, the load-handling assembly 104 and/or the drive wheels 106 are manipulated to position the forks 114 to be within the target placement location such that the pallet is inserted into the target placement location. In an embodiment, once placed at the target placement location, the pallet may be flush to one or several adjacent obstacles. However, the target placement location may not be precisely known. For example, in a trailer loading scenario, a desired target placement behavior may be to simply place a pallet flush against a wall and/or adjacent pallets, however, the exact coordinates for placement within the trailer may not be precisely measured.

In order to compensate for this scenario, the controller 202 navigates the autonomous forklift 100 towards the target placement location which is within a margin beyond the exclusion areas. The planning module 212 determines the target placement location by limiting exclusion areas to the margin within exclusion areas of observed obstacles, thereby allowing for a partial, but limited, collision. Obstacles that are not part of an expected flush placement collision area, or are of a category such as humans for which collision is not permitted, retain their exclusion areas to prevent unsafe or unexpected behavior. If these exclusion areas do not permit placement of the pallet, then a fault may be generated to indicate that flush placement may not be permissible.

Depending on the target placement location, the placement behavior of the autonomous forklift 100 may be accomplished by forward motion actuated by the drive wheels 106, lateral motion induced by a side-shifter assembly 122, or both.

At step 310, the controller 202 determines if there is resistance present against the pallet 310. After placement, the pallet is expected to collide with obstacles adjacent to the target placement location, however, the controller 202 does not know the exact location or timing of such collisions.

The controller 202 receives data indicating a resistance along at least one axis of motion. For example, for forward motion, the controller 202 receives at least one signal indicating the current drawn by the motor. For side-shifting of the forks 114, the controller 202 receives a signal indicating a stall current (i.e., the amperage or current drawn by an actuator or motor when an armature or shaft is prevented from rotating or moving) in the case of an electric side-shifter actuator, or a signal indicating a hydraulic cylinder pressure in the case of a hydraulic side-shifter actuator. A threshold for a stall may be determined based on the specific application, environment, or loads being placed depending on how much pressure would typically be applied for a specific placement behavior or location. The threshold can be predetermined by a human operator, by the controller 202, or by the artificial intelligence module 216 using previously stored placement, collision, and pallet data.

In an embodiment, the controller 202 receives a signal indicating a stall current drawn by a motor coupled to at least one drive wheel 106, indicating that forward and/or reverse rotation of the drive wheel 106 is prevented due to resistance from or against an obstacle.

In yet another embodiment, the resistance can be determined via at least one bump sensor located on the load-handling assembly 104, such as on, for example, the distal and/or lateral edges of the forks 114. When the bump sensor contacts an obstacle, the controller 202 receives a signal indicating resistance.

If the resistance is not above the threshold, then the controller 202 confirms whether or autonomous forklift 100 is at the target placement location at step 312. If the controller 202 confirms that the pallet is at the target placement location, then it is assumed that no collision is detected due to perception errors or unexpected motion of the obstacles known to be adjacent to the target placement location (i.e., such as lightweight pallets being shifted or pushed). The flush placement operation of the pallet is then deemed complete at step 314.

If, however, the controller 202 determines that the pallet is not at the target placement location, then the process reverts to step 308, where the pallet is placed at the target placement location.

If at step 310 the resistance is determined to be above the threshold, then the flush placement operation of the pallet is deemed complete at step 314, and the autonomous forklift 100 retracts or withdraws the forks 114 from the pallet, thereby leaving the pallet placed at the target placement location. In an embodiment, the controller 202 manipulates the load-handling assembly 104 and/or the drive wheels 106 in order to retract the forks 114 from the pallet.

Figure 4:
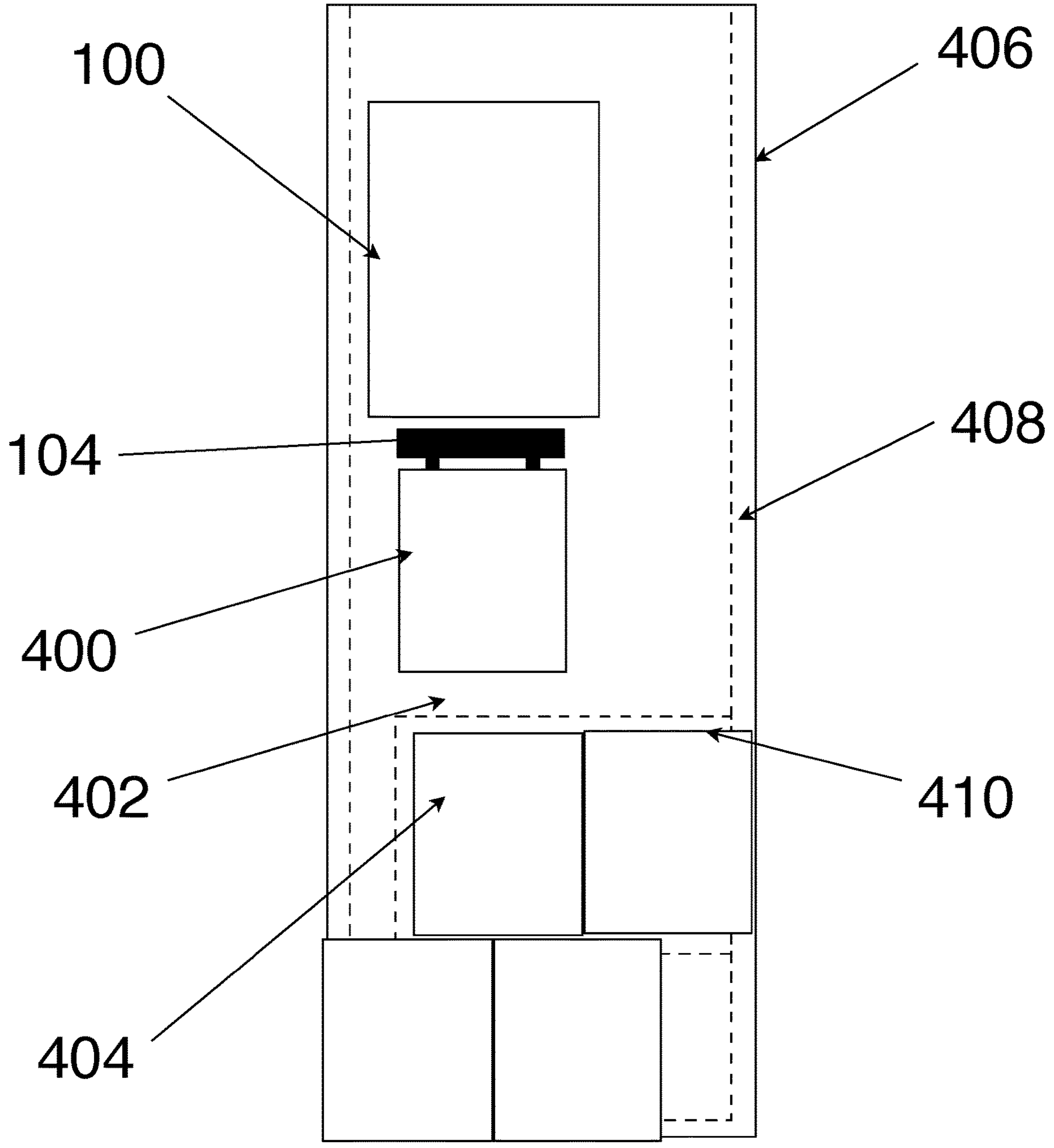
FIG. 4 is a top-down diagram of the autonomous forklift navigating to an approach pose, according to an embodiment of the present invention.

FIG. 4 is a top-down diagram of the autonomous forklift 100 navigating to an approach pose, according to an embodiment of the present invention. The approach pose 402, as described herein, is a location in close proximity to a target placement location (depicted in FIG. 5) of the pallet 400, but where the autonomous forklift 100 is not in collision or contact with any adjacent obstacles. The costmap generation module 210 generates a costmap that includes exclusion areas 408 between the navigation path of the autonomous forklift 100 and walls 406 of a trailer, as well as exclusion areas 410 between the autonomous forklift 100 and an adjacent pallet 404 within the trailer.

Figure 5:
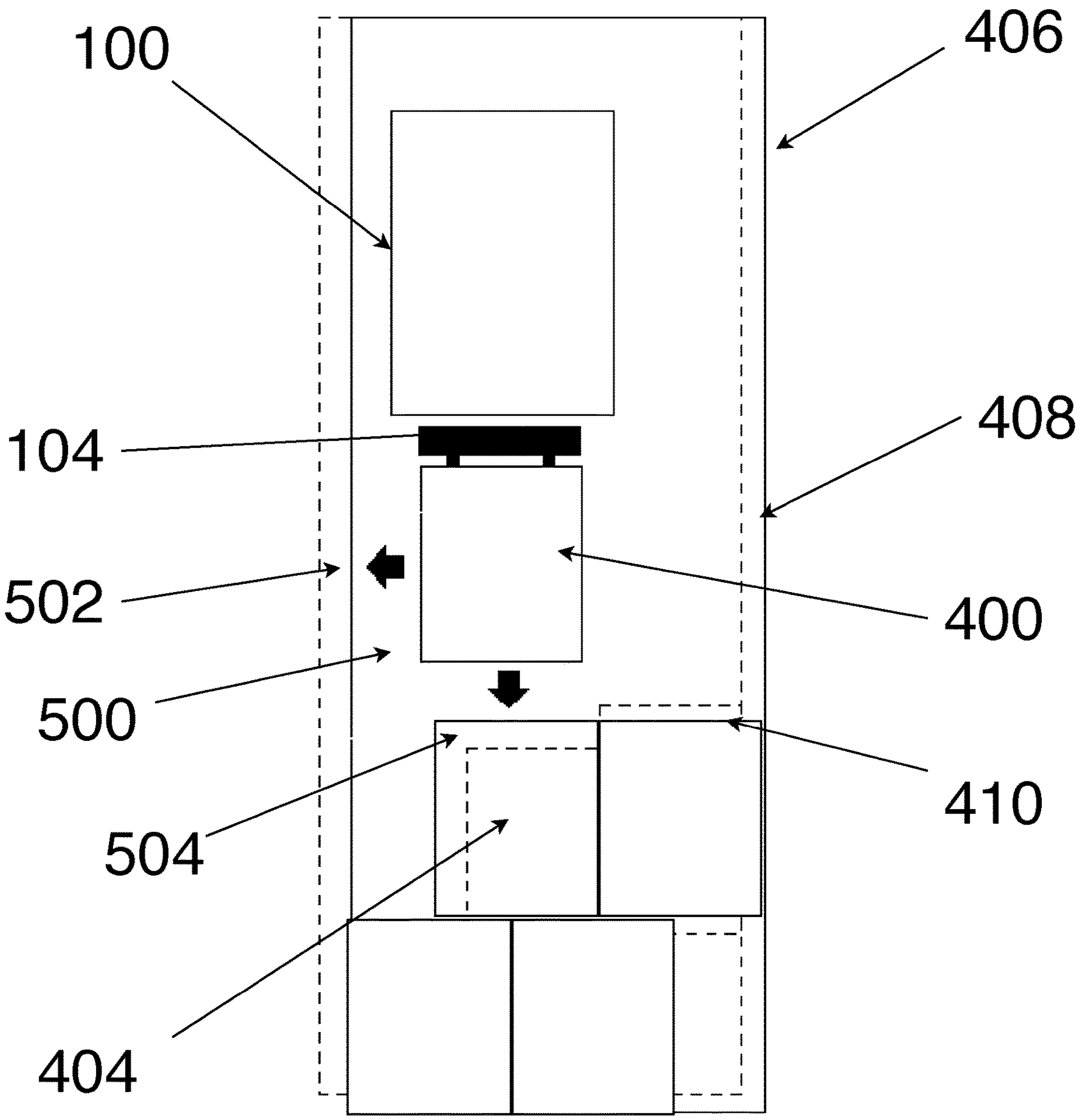
FIG. 5 is a top-down diagram of the autonomous forklift navigating to a target placement location, according to an embodiment of the present invention.

FIG. 5 is a top-down diagram of the autonomous forklift navigating 100 to a target placement location 500, according to an embodiment of the present invention. The target placement location 500 includes a margin 502 which is a location within the exclusion area 408 between the autonomous forklift 100 and the wall 406, as well as a margin 504 which is a location within the exclusion area 410 between the autonomous forklift 100 and the adjacent pallet 404. The margins 502, 504 allow the planning module 212 to plan a placement routine and determine a target placement location for the pallet that is at least partially within the exclusion areas in order to increase the likelihood of a flush placement of the pallet 400 with adjacent obstacles.

Figure 6:
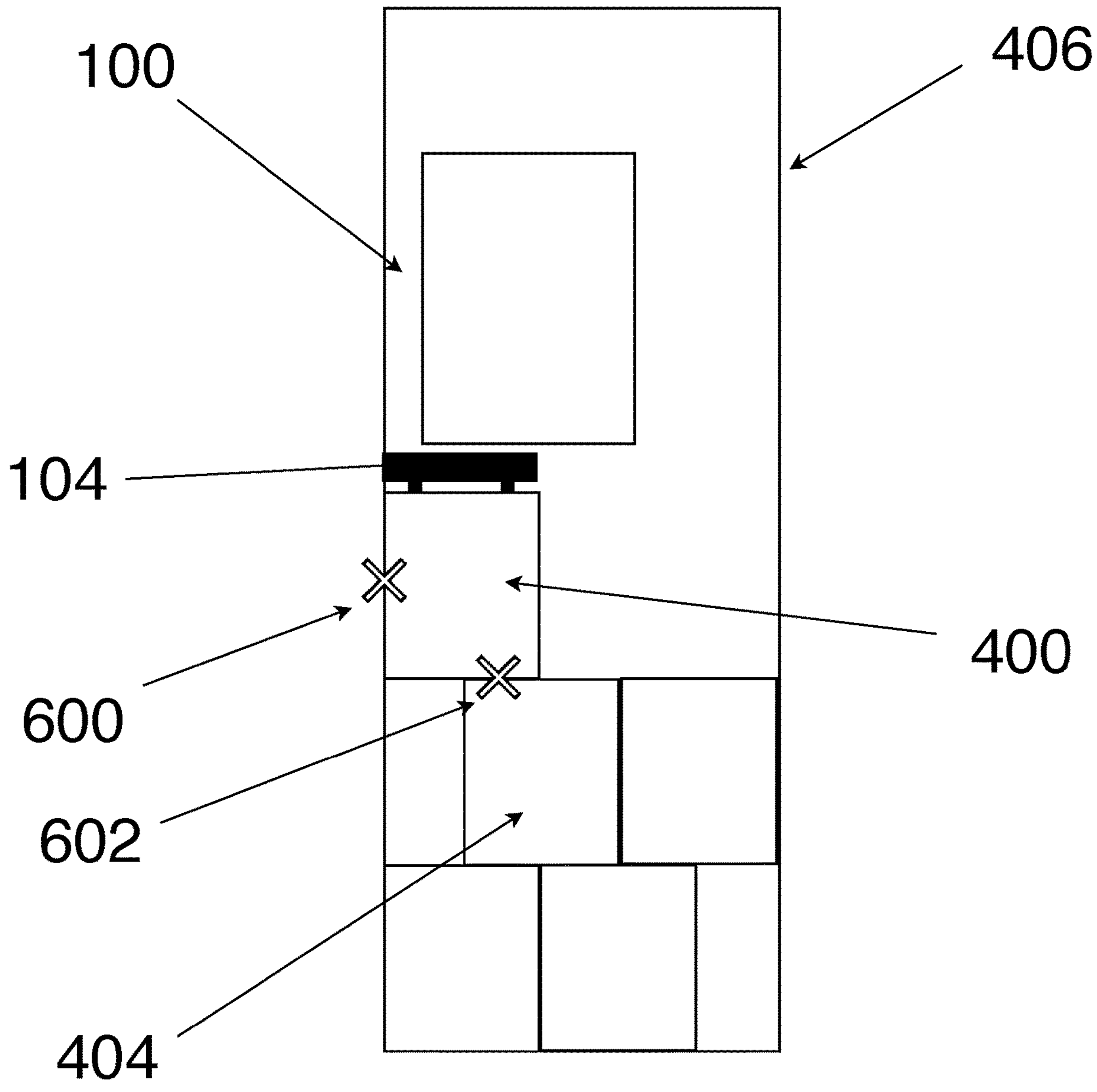
FIG. 6 is a top-down diagram of the autonomous forklift ceasing motion after inserting a pallet at the target placement location, according to an embodiment of the present invention.

FIG. 6 is a top-down diagram of the autonomous forklift 100 ceasing motion after inserting the pallet 400 at the target placement location, according to an embodiment of the present invention. If the controller 202 determines that a threshold resistance 600, 602 is present against the pallet 400 within the margins 502, 504 respectively, then the controller 202 commands the drive wheels 106 and/or the load-handling assembly 104 to cease movement. The presence of the threshold resistance 600, 602 indicates that the pallet 400 has been placed flush against adjacent obstacles, which in FIGS. 4-6 are the adjacent pallet 404 and trailer wall 406.

While the principles of the disclosure have been illustrated in relation to the exemplary embodiments shown herein, the principles of the disclosure are not limited thereto and include any modification, variation, or permutation thereof.

What is claimed is:

1. A system for flush placement of pallets by an autonomous forklift, comprising:
- a controller;
- a sensor module containing at least one sensor communicatively coupled to the controller;
- a perception module communicatively coupled the controller, the perception module identifying an obstacle in data received from the sensor module;
- a planning module communicatively coupled to the controller, the planning module determining an exclusion area adjacent to the obstacle, a target placement location that overlaps at least partially with the exclusion area, and a target placement height;
- a drive wheel communicatively coupled to the controller; and
- a load-handling assembly communicatively coupled to the controller, the load-handling assembly comprising a pair of forks capable of supporting a pallet,
- wherein the controller is configured to:
  - manipulate the drive wheel to navigate the autonomous forklift to a location in proximity to the target placement location,
  - manipulate the load-handling assembly to place the pair of forks at the target placement height,
  - manipulate at least one of the drive wheel and the load-handling assembly to position the pair of forks within the target placement location to effect flush placement of a pallet seated on the pair of pallet forks within the exclusion area,
  - determine a presence of resistance against the pallet, where the controller registers and is informed by the resistance present against the pallet of contact within the exclusion area between the pallet seated on the pair of forks and the obstacle, and
  - manipulate at least one of the drive wheel and the load-handling assembly to retract the forks from the pallet if with the presence of the resistance determined.

2. The system of claim 1, wherein the at least one sensor is selected from a group consisting of an Inertial Measurement Unit ("IMU"), a Light Detection and Ranging ("LiDAR") system, and a camera.

3. The system of claim 1, wherein the exclusion area is determined based on a classification of the obstacle.

4. The system of claim 1, wherein the location in proximity to the target placement location is a minimum distance from the obstacle based on the exclusion areas where the autonomous forklift can traverse in a safe manner.

5. The system of claim 1, wherein the controller determines if resistance is present based on a stall current signal from an actuator coupled to the load-handling assembly or a motor coupled to the drive wheel.

6. The system of claim 1, wherein the controller determines if resistance is present based on a hydraulic pressure signal from an actuator coupled to the load-handling assembly.

7. The system of claim 1, further comprising an artificial intelligence module communicatively coupled to the controller, the artificial intelligence module analyzing data collected over time by the controller in order to determine a subsequent target placement location.

8. A system for flush placement of pallets by an autonomous forklift, comprising:
- a controller;
- a sensor module containing at least one sensor communicatively coupled to the controller;
- a perception module communicatively coupled the controller, the perception module identifying an obstacle in data received from the sensor module;
- a planning module communicatively coupled to the controller, the planning module determining an exclusion area adjacent to the obstacle and a target placement location that overlaps at least partially with the exclusion area;
- a drive wheel communicatively coupled to the controller; and
- a load-handling assembly communicatively coupled to the controller, the load-handling assembly comprising a pair of forks capable of supporting a pallet,
- where the controller is configured to:
  - manipulate the drive wheel to navigate the autonomous forklift to a location in proximity to the target placement location,
  - manipulate at least one of the drive wheel and the load-handling assembly to position the pair of forks is within the target placement location to effect flush placement of a pallet seated on the pair of pallet forks within the exclusion area,
  - determine a presence of resistance against the pallet, where the controller registers and is informed by the resistance present against the pallet of contact within the exclusion area of the obstacle between the pallet seated on the pair of forks and the obstacle, and
  - manipulate at least one of the drive wheel and the load-handling assembly to retract the forks from the pallet with the presence of the if resistance determined.

9. The system of claim 8, wherein the at least one sensor is selected from a group consisting of an Inertial Measurement Unit ("IMU"), a Light Detection and Ranging ("LiDAR") system, and a camera.

10. The system of claim 8, wherein the exclusion area is determined based on a classification of the obstacle.

11. The system of claim 8, wherein the location in proximity to the target placement location is a minimum distance from the obstacle based on the exclusion areas where the autonomous forklift can traverse in a safe manner.

12. The system of claim 8, wherein the controller determines if resistance is present based on a stall current signal from an actuator coupled to the load-handling assembly or a motor coupled to the drive wheel.

13. The system of claim 8, wherein the controller determines if resistance is present based on a hydraulic pressure signal from an actuator coupled to the load-handling assembly.

14. The system of claim 8, wherein the controller manipulates the load-handling assembly to position the pair of forks within the target placement location by horizontally side-shifting the pair of forks.

15. The system of claim 8, wherein the controller manipulates the load-handling assembly to position the pair of forks within the target placement location by vertically adjusting the pair of forks.

16. A method of placing pallets flush against adjacent obstacles by an autonomous forklift having a drive wheel and a load-handling assembly with a pair of forks capable of supporting a pallet, comprising:

collecting visual data on an environment traversed by the autonomous forklift by a sensor module;

identifying an obstacle in the visual data by a perception module;

generating a costmap of the environment based on the identified obstacle by a planning module, wherein the costmap includes an exclusion area adjacent to the identified obstacle;

determining a target placement location of the pallet based on the costmap by the planning module, wherein the target placement location overlaps at least partially with the exclusion area;

actuating at least one of the drive wheel and the load-handling assembly, by a controller, to locate the pair of forks within the target placement location to effect flush placement of a pallet seated on the pair of pallet forks within the exclusion area;

determining, by the controller, a presence of resistance against the pallet, where the controller registers and is informed by the resistance present against the pallet of contact within the exclusion area of the obstacle between the pallet seated on the pair of forks and the obstacle; and manipulating at least of the drive wheel and the load-handling assembly to retract the forks from the pallet with the presence of the if resistance determined.

17. The method of claim 16, wherein the at least one sensor is selected from a group consisting of an Inertial Measurement Unit ("IMU"), a Light Detection and Ranging ("LiDAR") system, and a camera.

18. The method of claim 16, wherein the exclusion area is determined based on a classification of the obstacle.

19. The method of claim 16, wherein the location in proximity to the target placement location is a minimum distance from the obstacle based on the exclusion areas where the autonomous forklift can traverse in a safe manner.

20. The method of claim 16, wherein the controller determines if resistance is present based on a signal from an actuator coupled to the load-handling assembly or from a motor coupled to the drive wheel.

* * * * *